United States Patent
McVeety et al.

(10) Patent No.: US 9,621,636 B1
(45) Date of Patent: Apr. 11, 2017

(54) DISTRIBUTED PROCESSING SYSTEM THROTTLING

(71) Applicant: Google Inc., Mountain View, CA (US)

(72) Inventors: Samuel Green McVeety, Seattle, WA (US); Vyacheslav Alekseyevich Chernyak, Seattle, WA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 14/023,208

(22) Filed: Sep. 10, 2013

(51) Int. Cl.
*G06F 15/16* (2006.01)
*H04L 29/08* (2006.01)

(52) U.S. Cl.
CPC ............ H04L 67/10 (2013.01); H04L 67/32 (2013.01)

(58) Field of Classification Search
CPC ............................. H04L 67/10; H04L 67/32
USPC ........................................................ 709/201
See application file for complete search history.

(56) References Cited

U.S. PATENT DOCUMENTS

| | | | | |
|---|---|---|---|---|
| 8,103,685 | B1 * | 1/2012 | Farizon | G06Q 10/06 707/751 |
| 8,434,083 | B2 | 4/2013 | Burr et al. | |
| 2003/0041165 | A1 | 2/2003 | Spencer et al. | |
| 2009/0172014 | A1 * | 7/2009 | Huetter | G06F 17/30551 |
| 2010/0195549 | A1 * | 8/2010 | Aragon | H04W 52/0232 370/311 |
| 2010/0241884 | A1 * | 9/2010 | Barsness | G06F 1/3203 713/322 |
| 2014/0258538 | A1 * | 9/2014 | Archer | H04L 41/00 709/226 |

OTHER PUBLICATIONS

Abadi, D. J. et al. Aurora: a new model and architecture for data stream management. The VLDB Journal, 12(2):120-139, 2003, 20 pages.
Abadi, D.J., et al. "The design of the borealis stream processing engine." In In CIDR, pp. 277-289, 2005, 13 pages.
Adya A., et al. "Centrifuge: Integrated lease management and partitioning for cloud service." In NSDI, USENIX Association, 2010, 16 pages.
Babcock et al., "Models and issues in data stream systems." In Proceedings of the twenty-first ACM SIGMOD-SIGACT-SIGART symposium on Principles of database systems, ACM, 2002, 30 pages.
(Continued)

*Primary Examiner* — Viet Vu
*Assistant Examiner* — Herman Belcher
(74) *Attorney, Agent, or Firm* — Fish & Richardson P.C.

(57) ABSTRACT

Methods, systems, and apparatus are described for throttling a distributed processing system. In one aspect, a method includes identifying records being processed by a distributed processing system that performs agent processes, each of the records including a corresponding timestamp; determining, based on timestamps of the records that have been processed by a first agent process, a first agent progress; identifying a dependent agent process performed by the distributed processing system, wherein the dependent agent process processes only records that have been processed by the first agent process; determining, based on timestamps of records that have been processed by the dependent agent process, a dependent agent progress; and throttling performance of the first process based on the first agent progress and the dependent agent progress.

20 Claims, 4 Drawing Sheets

(56) References Cited

OTHER PUBLICATIONS

Bent, John "Data-Driven Batch Scheduling" A dissertation submitted in partial fulfillment of the requirements for the degree of Doctor of Philosophy (Computer Sciences) at the University of Wisconsin—Madison, (online) (retrieved on Jul. 26, 2013) Retrieved from the internet: http://pages.cs.wisc.edu/~johnbent/johnbent-dissertation.pdf, 138 pages.
Chandrasekaran et al. "TelegraphCQ: continuous dataflow processing." In Proceedings of the 2003 ACM SIGMOD international conference on Management of data, pp. 668-668. ACM, 2003, 12 pages.
Chang et al., "Bigtable: A distributed storage system for structured data." ACM Trans. Comput. Syst., 26:4:1-4:26, Jun. 2008, 14 pages.
Condie et al., "Map Reduce Online." Technical report, University of California, Berkeley, 2009, 15 pages.
Corbett et al., "Spanner: Google's globally-distributed database." to appear in Proceedings of OSDI, p. 1, 2012, 14 pages.
Cranor et al., "Gigascope: High performance network monitoring with an SQL interface." In Proceedings of the 2002 ACM SIGMOD International Conference on Management of Data, pp. 623-623. ACM, 2002, 1 page.
D. Peng, F. Dabek, "Large-scale incremental processing using distributed transactions and notifications." In 9th USENIX Symposium on Operating Systems Design and Implementation, 2010, 14 pages.
D. R. Jefferson. "Virtual time." ACM Transactions on Programming Languages and Systems, 7:404-425, 1985.
Dean and Ghemawat. "Map Reduce: simplified data processing on large clusters. Commun." ACM, 51:107-113, Jan. 2008, pp. 137-149.
Deelman and Szymanski. "Continuously monitored global virtual time." Technical Report, in Intern. Conf. Parallel and Distributed Processing Techniques and Applications, Las Vegas, NV, 1996, 10 pages.
FrontPage—Hadoop Wiki, "Apache Hadoop" (online) (Retrieved on Aug. 1, 2013) Retrieved from internet: http://wiki.apache.org/hadoop/, 5 pages.
Home nathanmarz/storm "GitHub" (online) (retrieved on Aug. 2, 2013) Retrieved from the internet: https://github.com/nathanmarz/storm/wiki, 2013, 2 pages.
Hou et al., "A Genetic Algorithm for Multiprocessor Scheduling" IEEE Transactions on Parallel and Distributed Systems, 5(2), Feb. 1994, pp. 113-120.
Hwang et al., "High-availability algorithms for distributed stream processing." In Data Engineering, 2005. ICDE 2005. Proceedings. 21st International Conference on, pp. 779-790. IEEE, 2005, 12 pages.
Johnson et al., "A heartbeat mechanism and its application in gigascope." In Proceedings of the 31st International Conference on Very Large Data Bases, pp. 1079-1088. VLDB Endowment, 2005.
Król et al., "Problem-Independent Approach to Multiprocessor Dependent Task Scheduling" International Journal of Electronics and Telecommunications 58(4), 2012, pp. 369-379.
Kwon et al. "Fault-tolerant stream processing using a distributed, replicated file system." Proceedings of the VLDB Endowment, 1(1):574-585, 2008, 12 pages.
L. Lamport. "Time, clocks, and the ordering of events in a distributed system." Commun. ACM, 21(7):558-565, Jul. 1978.

Li et al., "Out-of-order processing: a new architecture for high-performance stream systems." Proceedings of the VLDB Endowment, 1(1):274-288, 2008.
Logothetis et al, "Stateful bulk processing for incremental analytics." In Proceedings of the 1st ACM symposium on Cloud computing, pp. 51-62. ACM, 2010, 12 pages.
Madden S. and Franklin, M.J. Fjording the stream: An architecture for queries over streaming sensor data. In Data Engineering, 2002. Proceedings. 18th International Conference on, pp. 555-566. IEEE, 2002, 25 pages.
Motwani et al. "Query processing, resource management, and approximation in a data stream management system." Technical Report 2002-41, Stanford InfoLab, 2002, 12 pages.
Murray, et al. "Ciel: a universal execution engine for distributed data-flow computing." In Proceedings of the 8th USENIX conference on Networked systems design and implementation, p. 9. USENIX Association, 2011, 14 pages.
Neumeyer et al., "S4: Distributed stream computing platform." In Data Mining Workshops (ICDMW), 2010 IEEE International Conference on, pp. 170-177, Dec. 2010/.
Nossal, Roman "An Evolutionary Approach to Multiprocessor Scheduling of Dependent Tasks" (online) (retrieved on Jul. 26, 2013) Retrieved from internet: http://citeseerkist.psu.edu/viewdoc/download;
jsessionid=074703BD39A5F621609E089719869628?doi=10.1.1. 10.9565&rep=rep1&type=pdf. Parallel and Distributed Processing Lecture Notes in Computer Science, 1388, 1998, pp. 279-287.
Protobuf—Protocol Buffers—G . . . "Protocol Buffers." (online) (Retrieved on Aug. 2, 2013) Retrieved from internet: http://code.google.com/p/protobuf/, 2012, 2 pages.
Shah et al. "Flux: An adaptive partitioning operator for continuous query systems." In Data Engineering, 2003. Proceedings. 19th International Conference on, pp. 25-36. IEEE, 2003, 12 pages.
Stonebraker et al. "The 8 requirements of real-time stream processing." ACM SIGMOD Record, 34(4):42-47, 2005, 6 pages.
Tompkins, Mark F., "Optimization Techniques for Task Allocation and Scheduling in Distributed Multi-Agent Operations" Submitted to the. Department of Electrical Engineering and Computer Science. (online) (Retrieved on Jul. 26, 2013) Retrieved from the internet: http://dspace.mit.edu/bitstream/handle/1721.1/16974/53816027.pdf?sequence=1, 107 pages.
Trident tutorial nathanmarz/st . . . "Trident tutorial" (online) (retrieved on Aug. 2, 2013) Retrieved from the Internet: https://github.com/nathanmarz/storm/wiki/Trident-tutorial, 2013, 7 pages.
Tucker et al., "Exploiting punctuation semantics in continuous data streams." Knowledge and Data Engineering, IEEE Transactions on, 15(3):555-568, 2003, 14 pages.
Srivastava U and Widom J. Flexible time management in data stream systems. In Proceedings of the twenty-third ACM SIGMOD-SIGACT-SIGART symposium on Principles of database systems, pp. 263-274. ACM, 2004, 11 pages.
Yang et al., "Sonora: A platform for continuous mobile-cloud computing." Technical report, Technical Report. Microsoft Research Asia, 17 pages.
Zaharia et al., "Discretized streams: an efficient and fault-tolerant model for stream processing on large clusters." In Proceedings of the 4th USENIX conference on Hot Topics in Cloud Computing, pp. 10-10. USENIX Association, 2012, 6 pages.
Zaharia et al., "Resilient distributed datasets: A fault-tolerant abstraction for in-memory cluster computing." In Proceedings of the 9th USENIX conference on Networked Systems Design and Implementation, 2011, 14 pages.

* cited by examiner

DISTRIBUTED PROCESSING SYSTEM THROTTLING

BACKGROUND

This specification relates to distributed processing system throttling.

Distributed processing systems are systems that include multiple data processors that can be assigned to perform various tasks, or processes. They may include, for example, thousands of data processors that are each capable of performing a number of different processes. Distributed processing systems are often used for processing large volume of data and/or for processing continuous streams of data. Distributed processing systems are often designed to process data quickly and efficiently by dynamically reallocating data processors to perform tasks as needed.

SUMMARY

This specification describes technologies relating to distributed processing system throttling.

In general, one innovative aspect of the subject matter described in this specification can be embodied in methods that include the actions of identifying records being processed by a distributed processing system that performs a plurality of agent processes, each of the records including a corresponding timestamp; determining, based on one or more timestamps of one or more of the records that have been processed by a first agent process, a first agent progress for the first agent process; identifying a dependent agent process performed by the distributed processing system, wherein the dependent agent process processes only records that have been processed by the first agent process; determining, based on one or more timestamps of one or more records that have been processed by the dependent agent process, a dependent agent progress for the dependent agent process; and throttling performance of the first process by the distributed processing system based on the first agent progress and the dependent agent progress. Other embodiments of this aspect include corresponding systems, apparatus, and computer programs, configured to perform the actions of the methods, encoded on computer storage devices.

These and other embodiments can each optionally include one or more of the following features. Determining the first agent progress may comprise identifying, as the first agent progress, an oldest timestamp for an oldest record that is currently being processed by the first agent process; and determining the dependent agent progress may comprise identifying, as the dependent agent progress, an oldest recent timestamp for an oldest record that is currently being processed by the dependent agent process.

The actions may further comprise determining a difference between the oldest timestamp for the oldest record that is being processed by the first agent process and the oldest timestamp for the oldest record that is being processed by the dependent agent process; and determining that the difference between the first agent progress and the second agent progress meets a threshold measure of difference, and wherein throttling performance of the first process comprises throttling performance of the first process in response to determining that the difference between the first agent progress and the second agent progress meets the threshold measure of difference.

The distributed processing system may comprise a plurality of data processors, each data processor being capable of performing each of the plurality of agent processes; and throttling performance of the first process may comprise adjusting a number of data processors currently performing the first process.

The actions may further comprise determining a processing speed of the dependent agent process, and throttling performance of the first process may comprise reducing a processing speed of the first agent process to a speed less than or equal to the processing speed of the dependent agent process by reducing the number of data processors currently performing the first agent process.

The actions may further comprise increasing the processing speed of the dependent agent process by increasing the number of data processors currently performing the dependent agent process.

The actions may further comprise, after throttling performance of the first process, determining an updated first agent progress and an updated dependent agent progress; determining that a difference between the updated first agent progress and the updated dependent agent progress meets a threshold measure of difference; and throttling performance of the first process by the distributed processing system in response to determining that the difference between the updated first agent progress and the updated dependent agent progress meets a threshold measure of difference.

Particular embodiments of the subject matter described in this specification can be implemented so as to realize one or more of the following advantages. Using timestamps to throttle a distributed processing system addresses the cause of resource usage in terms of quantity of records being processed, rather than addressing symptoms of resource usage, e.g., as in capping processing power. While a naïve throttle may require periodic adjustment and monitoring as the processing requirements of the system, or the system itself, changes, the throttling described herein may dynamically adjust caps, throttling, and thresholds when processing requirements or the system changes. Adaptive throttling based on timestamps may result in more efficient use of system resources by reallocating data processors in a manner designed to prevent wasted processing power and prevent unnecessary backlogs that negatively affect storage requirements read/write times for the data processing system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
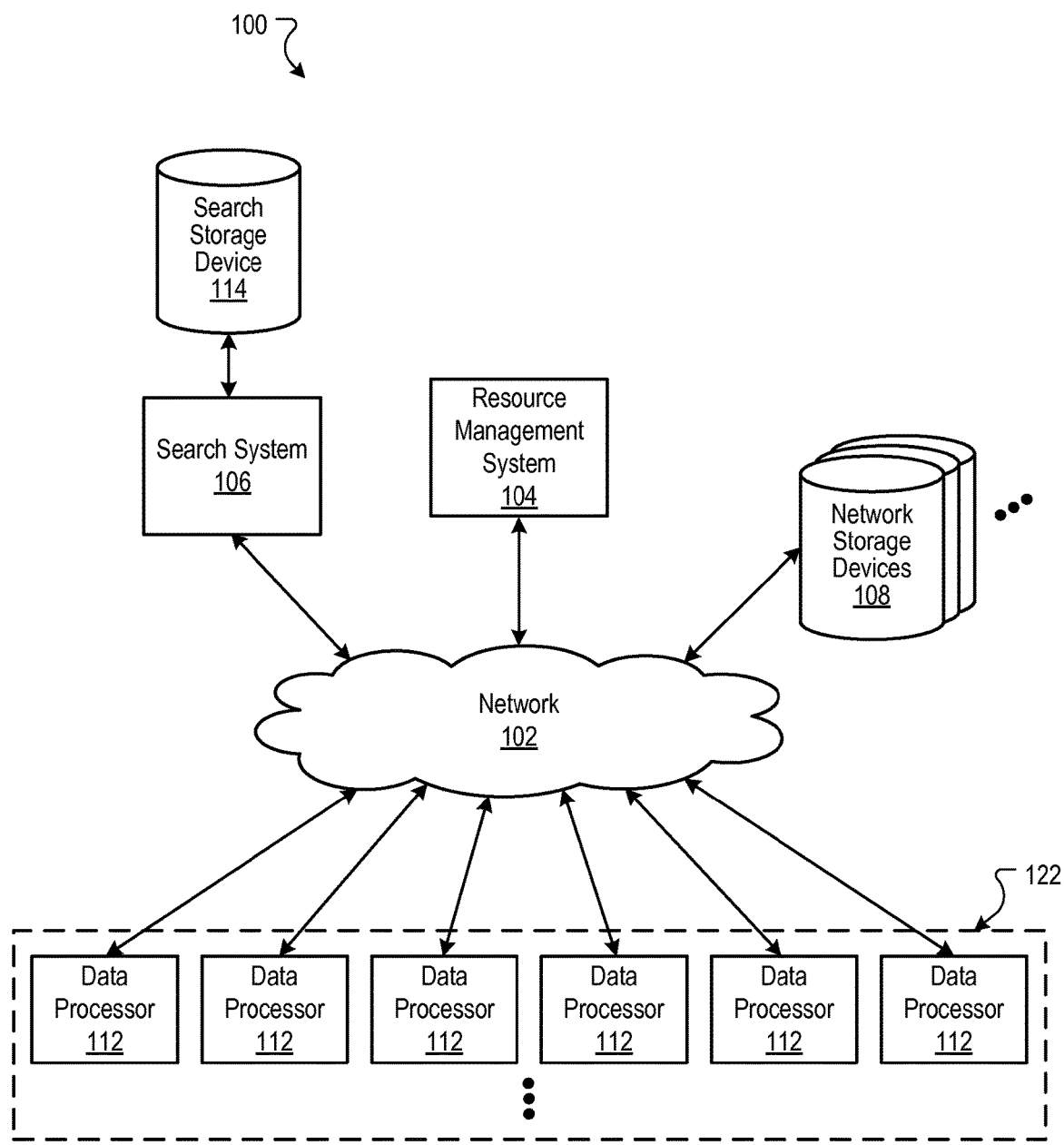
FIG. 1 is a block diagram of an example environment in which a distributed processing system operates.

A resource management system facilitates the performance of various processes by a distributed processing system. The distributed processing system may include many data processors that can each be assigned to performing a particular process, and the resource management system can dynamically reassign data processors to perform processes based on demand and in a manner designed to avoid backlogs and improve efficiency.

The distributed processing system performs various agent processes on records that have corresponding timestamps. A backlog includes records that have not been processed by an agent process. For example, a distributed processing system may be configured to perform three different processes on a continuous stream of query records received by a search engine. Each query record may include, for example, the query and a timestamp indicating the time the query was received by the search engine. A backlog may result from query records arriving faster than they can be processed, or when the distributed processing system experiences an interruption, such as a power outage.

The resource management system determines progress, e.g., the extent of backlogs, for a first agent process and a second, dependent agent process. The dependent agent process processes records that have first been processed by the first agent process. The backlogs are then compared and corrective steps, if required, are then taken.

For example, a first agent process may filter query records to discard queries that are considered spam. The resource management system determines, based on the timestamps of the records processed by a first agent process, the progress made by the first agent process. Progress may be measured, for example, based on a timestamp of the oldest record being processed by the first agent process. If current system time is 16:00:00, and the oldest record being processed by the filter process has a timestamp of 11:00:00, the difference (5 hours) may be used to indicate progress of the filter process.

The resource management system also determines the progress of the dependent agent process. For example, a query sorting process may be dependent on the spam filter process in order to avoid sorting queries that are considered spam. Progress of the dependent agent process may be measured in the same manner as progress of the first agent process. For example, if the current system time is 16:00:00, and the oldest record being sorted by the dependent sorting process has a timestamp of 9:00:00, the difference (7 hours) may be used to indicate progress of the sorting process.

Based on the first agent progress and the dependent agent progress, the resource management system throttles performance of the first agent process, if necessary. For example, a difference between the progress of the spam filter and the query sorter can be determined, e.g., 2 hours (7 hours−5 hours=2 hours). Based on the difference, the resource management system may determine that the spam filter should be throttled by assigning fewer data processors to performing the spam filter process.

In some implementations, the extent to which a process is throttled may depend on the processing speed of a dependent process. For example, the resource management system may determine how fast records are processed by the dependent query sorting process and reduce the number of data processors performing the filtering process to cause the filtering process to operate at a speed less than or equal to the speed of the query sorting process. The data processors that are no longer performing the spam filter process may be reassigned to one or more other processes, including the query sorting process. The throttling may result in a more efficient use of the distributed processing system by, for example, not wasting processing power on processes that do not require it, and by reducing the volume and cost of reading and writing to storage devices.

FIG. 1 is a block diagram of an example environment 100 in which a distributed processing system operates. A computer network 102, such as a local area network (LAN), wide area network (WAN), the Internet, or a combination thereof, connects a resource management system 104, distributed processing system 106, one or more network storage devices 108, and a search system 110.

The resource management system 104 manages the distributed processing system 106, which includes data processors 112 that are each capable of performing various tasks or processes. The distributed processing system may include thousands of data processors 112, which can perform processes independently or in combination with other data processors 112. For example, the resource management system 104 may perform process scheduling and resource management services for the data processing system 106, e.g., by assigning processes to be performed by one or more of the data processors 112, identifying and addressing faults and backlogs, and managing temporary and long-term storage.

Network storage devices 108 provide temporary and long-term storage for the distributed processing system 106 and, in some implementations, for individual data processors 112 and/or the resource management system 104. While the network storage devices 108 are depicted separately, they may also be part of the distributed processing system 108.

The search system 110 is an example system providing data to be processed by the distributed processing system 106. For example, the search system 110 may provide query records to the distributed processing system 106 for further processing. Query records may include, for example, search queries submitted to the search system 106 and related information, such as a timestamp indicating a time that the query was received, a device identifier for a device that submitted the query, and/or location data indicating a geographic location for the device that submitted the query. While the examples provided herein reference processing query records provided by a search system, records for other types of data being processed by other types of processes may be managed by the resource management system. For example, batch computing processes performed on database records may be managed by the resource management system. Other example systems, such as image processing systems or network indexing systems, may also submit other types of information, such as image data or network resource data to be processed by one or more processes of a distributed processing system.

By way of example, the distributed processing system 106 may be used to perform a variety of processes on query records received by the search system 110. Example processes include a spam filter process that identifies queries that are considered spam and removes them from further processing, an aggregation process that aggregates received queries over a certain period of time, and a trending query process that identifies queries that may be more or less popular than expected.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The resource management system 104 manages the distributed processing system 106 by assigning data processors 112 to the various processes to be performed on query records. The resource management system 104 may account for various scheduling and resource needs of one or more processes. For example, some processes require more data processors than others, some processes have a cap, or limit, on how fast they can be performed, some processes have a higher priority than other processes, and some processes read and/or write more to temporary and/or long term storage than others.

Some processes are dependent upon other processes, and the relationship between these processes may be presented as a directed acyclic graph. For example, the trending query process may compare the number of times a particular query has been received within the last 30 minutes to a number of times the particular query is expected to be received to determine if the particular query is significantly more popular than expected. The trending query process may depend upon the aggregation process, which can aggregate queries and determine the number of times the particular query has been received within the past 30 minutes. The aggregation process, in turn, may depend upon the spam filter process, which can identify spam queries that, in order to conserve system resources, will be discarded from further processing.

When processing data, some operations may be more burdensome on the distributed processing system 106 than other operations. For example, reading from and writing to long term storage devices, such as magnetic hard drives, may be slower than reading from and writing to short term storage devices, such as solid state drives. As another example, reading from a storage device that stores a significant amount of data may take longer than reading from a storage device that stores a relatively small amount of data. In some situations, e.g., when different processes operate at different speeds, backlogs can occur between processes, causing performance issues.

For example, if the spam filter processes 100 query records per second, and the dependent aggregation process processes 50 query records per second, a backlog may occur due to the spam filter processing records faster than the dependent aggregation process can. In situations with continuous streams of incoming data, such as a constant stream of query records, a processing backlog may cause the records to accumulate in the network storage devices 108. The resource management system 104 may reduce and/or prevent backlogs by dynamically reallocating data processors 112 to perform different processes. Using the previous example, the resource management system 104 may reduce the backlog by selectively throttling the spam filter process, e.g., by reassigning data processors from the spam filter process to the aggregation process to cause the aggregation process to process records faster than the spam filter process. When the backlog between the two processes is gone, or reaches a predetermined backlog threshold, the resource management system 104 may reassign data processors again, e.g., in a manner that results in both processes processing records at the same speed.

While the example environment 100 depicts the resource management system 104, distributed processing system 106, and network storage devices 108 separately in FIG. 1, they may be combined as part of one or more distributed processing systems. Other configurations of the distributed processing system may also be used. For example, one or more components of the distributed processing system may communicate directly with other components—e.g., the data processors 112 may communicate directly with one another and/or directly with non-networked storage devices. The throttling performed by the resource management system 104 is described in further detail below.

Figure 2:
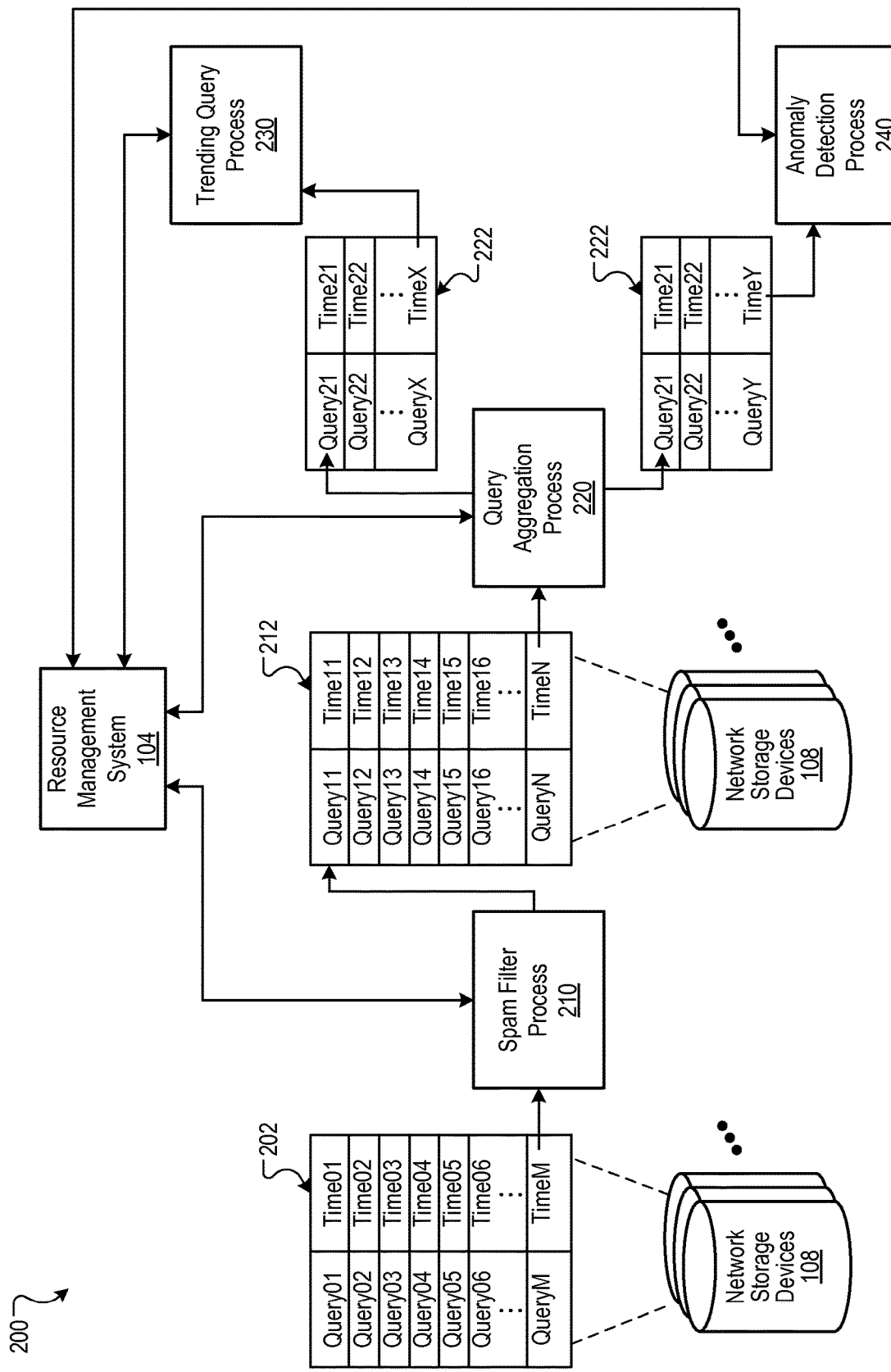
FIG. 2 is an illustration of an example process for throttling a distributed processing system.

FIG. 2 is an illustration of an example process 200 for throttling a distributed processing system. In the example process 200, the resource management system 104 is managing four processes: a spam filter process 210, a query aggregation process 220, a trending query process 230, and an anomaly detection process 240. The dependencies between the example processes are indicated by the arrows, e.g., the spam filter process 210 is independent, the query aggregation process 220 depends on the spam filter process 210, and the trending query process 230 and anomaly detection process 240 both depend on the query aggregation process 220. The resource management system 104 manages, for example, a number of data processors of the distributed processing system that are performing each process (e.g., 210, 220, 230, and 240) at any given point in time. The actions described as being performed by a process (e.g., 210, 220, 230, and 240) are performed by one or more of the data processors assigned to perform the process.

The example process 200 also depicts example records, such as the initial query records 202, filtered query records 212, and aggregated query records 222. Each example query record includes a query, e.g., Query01, and a timestamp, e.g., Time01. The query records may be stored, for example, in one or more of the network storage devices 108. The initial query records 202 may be stored in the network storage devices by, for example, a search system that receives queries and creates query records that each include a received query and a timestamp indicating a time the query was received by the search system.

The resource management system 104 identifies records being processed by the distributed processing system. For example, the resource management system 104 may receive data from the search system, or any of the processes 210-240, indicating which query records are being processed or have yet to be processed. As another example, resource management system may identify records in one or more queues that have been initialized for each process. Each record includes a corresponding timestamp, e.g., in the example process 200, the timestamp represents the time the corresponding query was received by the search system.

The resource management system 104 determines, based on a timestamp for a record that has been processed by the first process, a progress for the first process. In some implementations, the progress of the first process is determined by a timestamp for an incoming record. For example, the initial query records 202 are displayed in chronological order, with the most recent record at the top, e.g., Query01/Time01, and the oldest record at the bottom, e.g., QueryM/TimeM. When the spam filter process 210 begins processing the record that corresponds to QueryM, the spam filter process 210 may provide data to the resource management system 104 indicating that it has begun processing a record with a timestamp, TimeM. The resource management system 104 can compare TimeM to a current system time to determine the progress of the spam filter. For example, if TimeM is 13:00:00, and the current system time is 19:00:00, the progress of the spam filter may be the difference in time, e.g., 6 hours.

In some implementations, the progress of the first process is determined by a timestamp for an outgoing record. For example, the filtered records 212 are depicted in chronological order, with the record most recently processed by the spam filter being placed at the top, e.g., Query11/Time11. When the spam filter process 210 finishes processing the record that corresponds to Query11, the spam filter process 210 may provide data to the resource management system 104 indicating that it has finished processing a record with a timestamp, Time11.

While the foregoing examples indicate that process progress can be determined at the beginning or end of a process, in some implementations the resource management system may be notified of the progress at any point between the beginning and end of the process. In some implementations, progress is only measured periodically, e.g., not determined for every record, but determined every few minutes or after a particular number of records have been processed.

In some implementations, a process' progress is measured in terms of the oldest timestamp being processed by any data processor performing the process. For example, in situations where one or more processes do not receive or process records in chronological order, an oldest timestamp being processed may be used to measure progress. Other methods may also be used to determine progress, e.g., a running average of the n oldest timestamps being processed, where n is a positive integer, may be used to measure progress, or a timestamp of a most recently processed record may be used to measure progress.

The resource management system 104 identifies a dependent process performed by the distributed processing system. The dependent process processes only records that have been processed by the first process. For example, the query aggregation process 220 is dependent on the spam filter process 210 and does not process any records that have not already been processed by the spam filter process 210.

The resource management system 104 determines, based on records that have been processed by the dependent process, a progress for the dependent agent process. As with the determination of progress for the first process, progress for the dependent process may be determined based on the timestamps of records that are incoming, e.g, TimeN, outgoing, e.g., Time21, or currently being processed. The filtered query records 212 may, in some implementations, be in chronological order according to their timestamp, or may in some implementations, be in the order in which they have finished being processed by the spam filter process 210, with the most recent records at the top. In some implementations, the progress may be measured relative to system time. For example, if the oldest record being processed, e.g., Time21, is 11:00:00, and the current system time is 19:00:00, the progress may be the difference in time, e.g., 8 hours. In some implementations, progress may be measured relative to the timestamp of the record most recently processed by the first process. By way of example, if Time21 is 11:00:00, and the most recently filtered record has a timestamp (e.g., Time11) of 13:00:00, the progress of the query aggregation process may be the difference in time, e.g., 2 hours.

In the example process 200, the trending query process 230 and anomaly detection process 240 are each dependent on the query aggregation process 220, and neither have any process that depend upon them. As with the spam filter process 210 and query aggregation process 200, the progress of the trending query process 230 and anomaly detection process 240 can be determined based on timestamps of records that are beginning the corresponding process, finishing the corresponding process, or during the corresponding process.

Based on the progress of the first process and the dependent processes, the resource management system throttles performance of the first process. In some implementations, the resource management system 104 determines a difference between the timestamps of the oldest records being processed by a first process and its dependent process. The difference between timestamps, or difference in progress, may be compared to a threshold measure of difference to determine whether the first process should be throttled. For example, if the timestamp, Time11, is 13:00:00, and timestamp, Time21, is 11:00:00, the difference is 2 hours. This may indicate, for example, the query aggregation process 220 is two hours behind the spam filter process 210. The resource management system may compare the two hour difference to a difference threshold to determine whether the spam filter process 210 should be throttled. For example, if the two hour difference, e.g., the backlog, is greater than a 30 minute difference threshold, then the spam filter process 210 may be throttled in order to reduce its processing speed, which may help reduce the backlog between the spam filter process 210 and the query aggregation process 220.

In some implementations, throttling a first process includes adjusting a number of data processors performing the first process. For example, the spam filter process 210 may have 300 data processors of a distributed processing system currently dedicated to performing the spam filter process 210. The resource management system 104 may, for example, cause some data processors to idle, or re-assign some of the data processors to performing a different process, such as the query aggregation process 220 or the trending query process 230.

In some implementations, the resource management system 104 determines a processing speed of the dependent process, and throttles the first process in a manner that reduces the speed of the first process to be less than or equal to the speed of the dependent process. For example, if the query aggregation process 220 is processing 1,000 query records per second, and the spam filter process 210 is processing 3,000 records per second, the spam filter process 210 may be throttled to 1,000 query records per second.

In some implementations, the dependent process may be throttled in a manner that increases the speed of the dependent process. For example, with the query aggregation process 220 is processing at 1,000 records per second, the resource management system 104 may assign more data processors to performing the query aggregation process 220 to bring the processing speed up to 2,000 records per second.

In some implementations, processing speed may be measured as a rate of change in process progress. For example, the change in time, over time, of the timestamp of the oldest record being processed may be used to measure processing speed. Given a timestamp for the oldest record being processed at time T1 of 02:00:00, and one hour later a timestamp for the oldest record then being processed of 04:00:00, the process may be processing at a speed of two hours per hour, or 2× "real time." As another example, if the timestamp of the oldest record being processed at time T1 is 02:00:00, and one minute later a timestamp of the oldest record then being processed is 02:00:30, the process may be processing at a speed of 30 seconds per minute, or 0.5× "real time."

In some implementations, each process has a normal processing speed and a maximum processing speed. For example, a normal processing speed for a process may be a default maximum processing speed using a default number of data processors under normal conditions, e.g., without backlogs or throttling, the first process may normally be capable of processing 1,000 records per second, or 1× real time. This normal speed may be the same or similar for each process, which may reduce the likelihood of backlogs in between processes. In other words, if every process operates at 1,000 records per second, and a live stream of records arrives no faster than 1,000 records per second, the distributed processes system should operate with relatively short backlogs and only occasional throttling for minor interruptions and discrepancies during processing.

In some implementations, the normal processing speed, and number of data processors needed to operate at the speed, may be learned empirically over time. Often, actual processing speeds may vary, for example, some records may take longer to process than others, and other issues, such as increases or decreases in demand, power outages, network interruptions, hardware failures may occur in any part of the distributed processing system. In some implementations, a process' normal processing speed is 1× "real time" processing speed. For example, a process may, by default, be assigned a number of data processors that allows the process to process records at a rate similar to or equal to the rate at which the process receives records.

A maximum processing speed for a process may be, for example, a selected limit on the speed at which the distributed processing system can perform a particular process. For example, the spam filter process, which has a normal processing speed of 1,000 records per second, may have a selected maximum processing speed of 3,000 records per second, or 3× real time. In some implementations, the maximum processing speed may be learned empirically over time. In some implementations, the maximum processing speed can be selected by a user and/or based on observations of processing speed and usage of distributed processing system resources. The maximum processing speed need not be an actual maximum speed. For example, in some situations, gains in processing speed may not outweigh the "cost" in terms of system resources, and a more efficient maximum processing speed may be used. A process may, for example, operate at 3,000 records per second using 25% of the data processors of a distributed processing system, but if increasing the processing speed to 3,100 records per second requires 50% of the data processors, the maximum processing speed may be chosen as 3,000 records per second.

In some implementations, when the resource management system 104 throttles a dependent process in a manner that causes the dependent process to operate at its maximum processing speed. In situations where a backlog of records exists between a first process and a dependent process, the dependent process may be throttled to a maximum processing speed in order to reduce the backlog between processes. For example, if the maximum processing speed of the query aggregation process 220 is 2,000 records per second, the resource management system 104 may assign an empirically predetermined number of data processors to performing the query aggregation process 220 such that the process operates at 2,000 records per second. The additional data processors may, for example, have been re-assigned from the spam filter process 210.

In some implementations, the resource management system 104 periodically determines updated progress for one or more of the processes. For example, the resource management system 104 may periodically obtain data indicating, for both the spam filter process 210 and query aggregation process 220, a timestamp of an oldest record being processed. The updated progress can be compared to determine, for example, whether throttling should continue, be adjusted, or reverted to normal processing speed.

By way of example, assume that at a system time of 19:00:00, the oldest record being processed by the spam filter process 210 has a timestamp, Time11, of 13:00:00, indicating that the spam filter process 210 is six hours behind. Because of the backlog of initial records 202, the spam filter process 210 is, without throttling, processing at its maximum processing speed of 3,000 records per second. Assume also that the timestamp of the oldest record being processed by the query aggregation process 220 has a timestamp, Time21, of 11:00:00, indicating that the query aggregation process 220 is eight hours behind the current time, and two hours behind the spam filter process 210. Because of the backlog of filtered records 212, the query aggregation process may be processing at a speed of 1,500 records per second, which is, in this example, higher than normal processing speed, but slower than the maximum processing speed of the query aggregation process 220. In this example, the backlog of filtered records 212 between the spam filter process 210 and the query aggregation process 220 may continue to grow, which could lead to an unnecessary waste of system resources.

The resource management system 104 may throttle the spam filter process 210 to reduce the processing speed to, for example, 1,500 records per second, by reassigning data processors of the distributed processing system. The resource management system 104 may also throttle the query aggregation process 220 to increase the processing speed to, for example, 2,000 records per second, by assigning more data processors of the distributed processing system to perform the query aggregation process 220. Due to the difference in throttled processing speeds, the backlog of filtered records 212 should be reduced over time. Assuming that the spam filter process 210 is processing records faster than they are being added to the initial records 202, the backlog of initial records should also be reduced over time.

The resource management system 104 may periodically obtain updated progress from the spam filter process 210 and the query aggregation process 220. For example, each process may provide, every five minutes, a timestamp for the oldest record processed by the corresponding system. When the difference between timestamps of oldest records being processed meets a threshold measure of difference, the resource management system 104 may again throttle one or both processes. For example, if the threshold measure of difference is five minutes, the resource management system 104 may throttle the spam filter process 210 and query aggregation process to 1,800 records per second in response to determining that the difference in progress between the spam filter process 210 and query aggregation process 220 is less than the five minute threshold.

The resource management system 104 may continue to obtain updated progress from each process to determine whether additional throttling may be appropriate. If, for example, the backlog of initial records 202, measured by the difference between the oldest record processed by the spam filter process 210 and the current system time, is reduced to a predetermined threshold, such as one minute, the resource management system 104 may reassign data processors again, resulting in the spam filter process 210 processing at its normal processing speed of 1,000 records per second, or 1× real time. The query aggregation process 220, trending query process 230, and anomaly detection process 240 may likewise be made to operate at normal processing speed of 1,000 records per second, or 1× real time.

While the foregoing examples use records per second and multiples of "real time" as measures of speed, other measures of speed may be used. For example, data transfer or computation rates, e.g., in bits, bytes, megabytes, etc., may be used as a measure of speed.

In some implementations, quantities of data processors or combined computational power of data processors may be used as opposed to using records per second or data rates as a measure of speed. For example, the normal processing "speed" of a process may be the speed the process will operate at with 10 data processors performing the process, while its maximum processing "speed" may be the speed the process will operate at with 30 data processors performing the process. In some implementations a percentage of the data processors, or processing power, of a distributed processing system may be used. For example, a normal processing speed for a process may be 5% of a distributed processing system's computational power, while a maximum processing speed for the process may be 25% of the distributed processing system's computational power.

Figure 3:
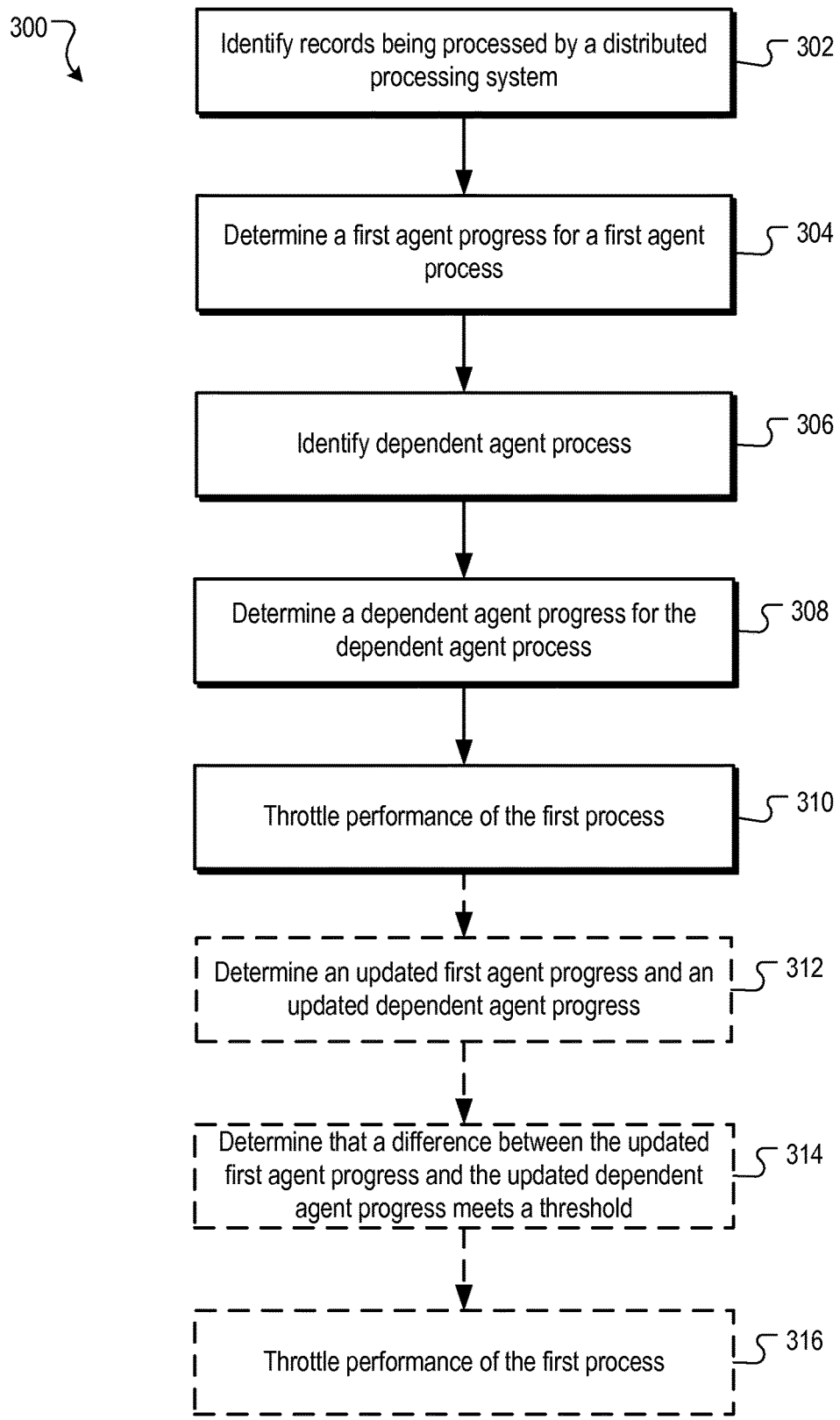
FIG. 3 is a flow diagram of an example process in which a distributed processing system is throttled.

FIG. 3 is a flow diagram of an example process 300 in which a distributed processing system is throttled. The process may be performed by data processing apparatus, such as the resource management system described above.

Records being processed by a distributed processing system are identified (302). The distributed processing system performs agent processes, and each of the records includes a corresponding timestamp. For example, records may be stored in one or more data storage devices and accessible to a resource management system that facilitates the performance of agent processes by a distributed processing system.

A first agent progress is determined for a first agent process (304). The progress of the first agent process is determined based on the timestamps of at least one record that has been processed by the first agent process. For example, the timestamp of the oldest record processed by the first agent process can be compared to a current system time to determine a difference that indicates the progress of the first agent process. If an oldest record has a timestamp of 12:00:00, and the current system time is 18:00:00, the progress of the first agent process may be six hours.

A dependent agent process is identified (306). The dependent agent process is a process that is performed by the distributed processing system and that processes only records that have been processed by the first agent process. For example, data processors performing the dependent agent process may not process records unless instructed to do so by the resource management system or the first agent process, e.g., by a remote procedure call (RPC).

A dependent agent progress is determined for the dependent agent process (308). The progress of the dependent agent process is determined based on the timestamps of at least one of the records that have been processed by the dependent agent process. For example, the timestamp of the oldest record processed by the dependent agent process can be compared to the timestamp of the oldest record processed by the first agent process to determine a difference that indicates the progress of the dependent agent process. For example, if an oldest record processed by the dependent agent process has a timestamp of 9:00:00, and the oldest record processed by the first agent process is 12:00:00, the progress of the dependent agent process may be three hours.

Performance of the first process is throttled based on the first agent progress and the dependent agent progress (310).

For example, the distributed processing system may slow or pause the first agent process, e.g., by causing one or more data processors performing the first agent process to stop, or to perform a different task or process.

In some implementations, an updated first agent progress and updated dependent agent progress are determined for, respectively, the first agent process and dependent agent process (312). For example, after throttling the first agent process, updated first agent progress may indicate that an oldest record currently being processed by the first agent process has a timestamp of 22:00:00, while an updated dependent agent progress may indicate that an oldest record currently being processed by the dependent agent process has a timestamp of 22:15:00.

In some implementations, the process 300 determines that a difference between the updated first agent progress and the updated dependent agent progress meets a threshold measure of difference (314). Given a threshold of, for example, 30 minutes, the 15 minute difference between progress of the first agent process and the dependent agent process in the above example meets the example threshold of 30 minutes.

In response to determining that the difference between the updated first agent progress and the updated dependent agent progress meets a threshold measure of difference, performance of the first agent process is throttled (316). For example, if data processors of a distributed processing system were previously reassigned to slow down performance of the first agent process, the data processors may be reassigned again to speed up performance of the first agent process.

Figure 4:
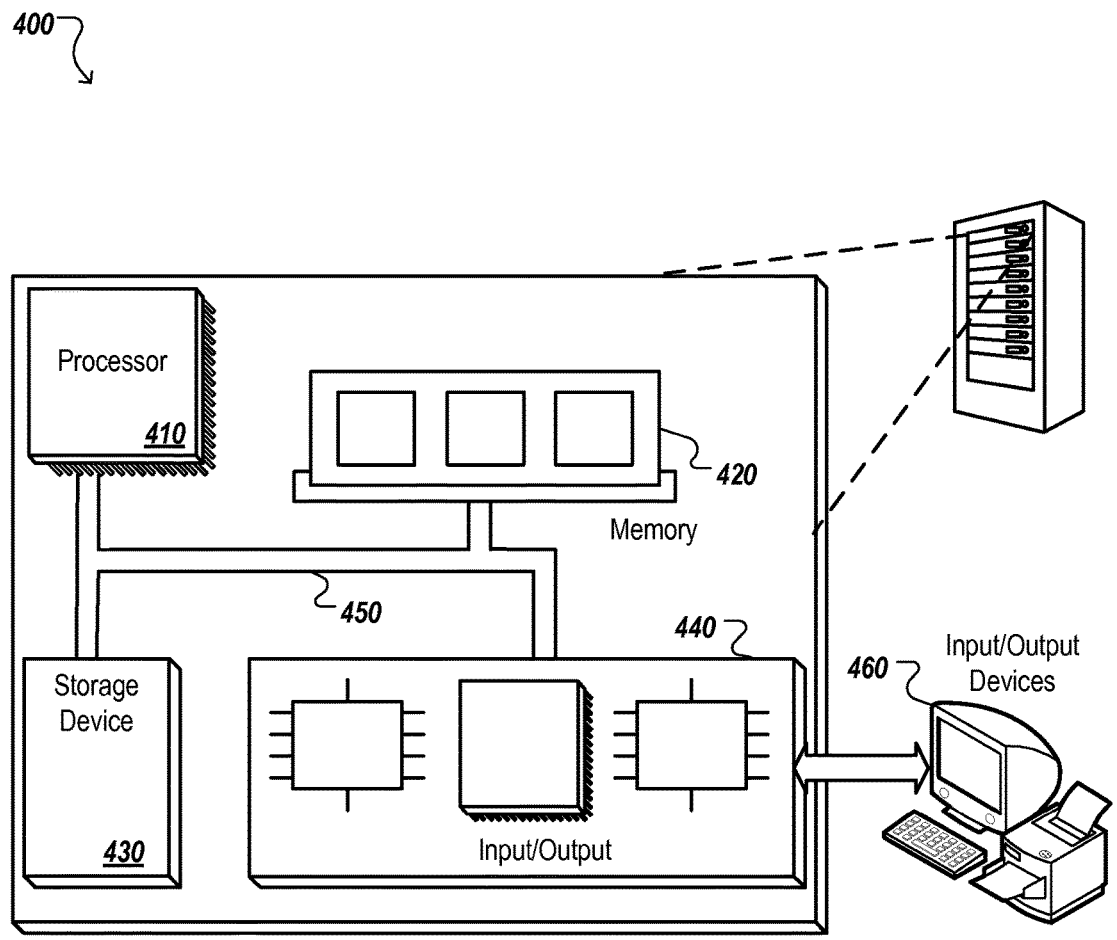
FIG. 4 is a block diagram of an example data processing apparatus.

FIG. 4 is a block diagram of an example data processing apparatus 400. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
    identifying records being processed by a distributed processing system that performs a plurality of agent processes, each of the records including a corresponding timestamp specifying a time for the record prior to a time that the record is processed by a first agent process in the distributed processing system;
    determining, based on one or more of the timestamps of one or more of the records that have been processed by the first agent process, a first agent progress for the first agent process;
    identifying a second agent process performed by the distributed processing system, wherein the second agent process processes only records that have been processed by the first agent process and is processing records that have been processed by the first agent process concurrently with the first agent process processing records to be provided to the second agent process;
    determining, based on one or more of the timestamps of one or more records that have been processed by the second agent process, a second agent progress for the second agent process; and
    throttling performance of the first agent process by the distributed processing system based on the first agent progress and the second agent progress.

2. The method of claim 1, wherein:
    determining the first agent progress comprises identifying, as the first agent progress, an oldest timestamp for an oldest record that is currently being processed by the first agent process; and
    determining the second agent progress comprises identifying, as the second agent progress, an oldest timestamp for an oldest record that is currently being processed by the second agent process.

3. The method of claim 2, further comprising:
    determining a difference between the oldest timestamp for the oldest record that is being processed by the first agent process and the oldest timestamp for the oldest record that is being processed by the second agent process; and
    determining that the difference between the first agent progress and the second agent progress meets a threshold measure of difference, and wherein throttling performance of the first process comprises throttling performance of the first process in response to determining that the difference between the first agent progress and the second agent progress meets the threshold measure of difference.

4. The method of claim 1, wherein:
    the distributed processing system comprises a plurality of data processors, each data processor being capable of performing each of the plurality of agent processes; and
    throttling performance of the first process comprises adjusting a number of data processors currently performing the first process.

5. The method of claim 4, further comprising:
    determining a processing speed of the second agent process, and wherein throttling performance of the first process comprises reducing a processing speed of the first agent process to a speed less than or equal to the processing speed of the second agent process by reducing the number of data processors currently performing the first agent process.

6. The method of claim 5, further comprising:
    increasing the processing speed of the second agent process by increasing the number of data processors currently performing the dependent second agent process.

7. The method of claim 1, further comprising:
    after throttling performance of the first process, determining an updated first agent progress and an updated second agent progress;
    determining that a difference between the updated first agent progress and the updated second agent progress meets a threshold measure of difference; and
    throttling performance of the first process by the distributed processing system in response to determining that the difference between the updated first agent progress and the updated second agent progress meets a threshold measure of difference.

8. A system comprising:
    a data processing apparatus; and
    a data store storing instructions that, when executed by the data processing apparatus, cause the data processing apparatus to perform operations comprising:

identifying records being processed by a distributed processing system that performs a plurality of agent processes, each of the records including a corresponding timestamp specifying a time for the record prior to a time that the record is processed by a first agent process in the distributed processing system;

determining, based on one or more timestamps of one or more of the records that have been processed by the first agent process, a first agent progress for the first agent process;

identifying a second agent process performed by the distributed processing system, wherein the second agent process processes only records that have been processed by the first agent process and is processing the records that have been processed by the first agent process concurrently with the first agent process processing records to be provided to the second agent process;

determining, based on one or more timestamps of one or more records that have been processed by the second agent process, a second agent progress for the second agent process; and throttling performance of the first agent process by the distributed processing system based on the first agent progress and the second agent progress.

9. The system of claim 8, wherein:

determining the first agent progress comprises identifying, as the first agent progress, an oldest timestamp for an oldest record that is currently being processed by the first agent process; and determining the second agent progress comprises identifying, as the second agent progress, an oldest timestamp for an oldest record that is currently being processed by the second agent process.

10. The system of claim 9, wherein the operations further comprise:

determining a difference between the oldest timestamp for the oldest record that is being processed by the first agent process and the oldest timestamp for the oldest record that is being processed by the second agent process; and determining that the difference between the first agent progress and the second agent progress meets a threshold measure of difference, and wherein throttling performance of the first process comprises throttling performance of the first process in response to determining that the difference between the first agent progress and the second agent progress meets the threshold measure of difference.

11. The system of claim 8, wherein:

the distributed processing system comprises a plurality of data processors, each data processor being capable of performing each of the plurality of agent processes; and throttling performance of the first process comprises adjusting a number of data processors currently performing the first process.

12. The system of claim 11, wherein the operations further comprise:

determining a processing speed of the second agent process, and wherein throttling performance of the first process comprises reducing a processing speed of the first agent process to a speed less than or equal to the processing speed of the second agent process by reducing the number of data processors currently performing the first agent process.

13. The system of claim 12, wherein the operations further comprise:

increasing the processing speed of the second agent process by increasing the number of data processors currently performing the second agent process.

14. The system of claim 8, wherein the operations further comprise:

after throttling performance of the first process, determining an updated first agent progress and an updated second agent progress;

determining that a difference between the updated first agent progress and the updated second agent progress meets a threshold measure of difference; and throttling performance of the first process by the distributed processing system in response to determining that the difference between the updated first agent progress and the updated second agent progress meets a threshold measure of difference.

15. A non-transitory computer readable medium storing instructions that, when executed by a data processing apparatus, cause the data processing apparatus to perform operations comprising:

identifying records being processed by a distributed processing system that performs a plurality of agent processes, each of the records including a corresponding timestamp specifying a time for the record prior to a time that the record is processed by a first agent process in the distributed processing system;

determining, based on one or more timestamps of one or more of the records that have been processed by the first agent process, a first agent progress for the first agent process;

identifying a second agent process performed by the distributed processing system, wherein the second agent process processes only records that have been processed by the first agent process and is processing records that have been processed by the first agent process concurrently with the first agent process processing records to be provided to the second agent process;

determining, based on one or more timestamps of one or more records that have been processed by the second agent process, a second agent progress for the second agent process; and throttling performance of the first agent process by the distributed processing system based on the first agent progress and the second agent progress.

16. The non-transitory computer readable medium of claim 15, wherein:

determining the first agent progress comprises identifying, as the first agent progress, an oldest timestamp for an oldest record that is currently being processed by the first agent process; and determining the second agent progress comprises identifying, as the second agent progress, an oldest timestamp for an oldest record that is currently being processed by the second agent process.

17. The non-transitory computer readable medium of claim 16, wherein the operations further comprise:

determining a difference between the oldest timestamp for the oldest record that is being processed by the first agent process and the oldest timestamp for the oldest record that is being processed by the second agent process; and determining that the difference between the first agent progress and the second agent progress meets a threshold measure of difference, and wherein throttling performance of the first process comprises throttling performance of the first process in response to determining that the difference between the first agent progress and the second agent progress meets the threshold measure of difference.

18. The non-transitory computer readable medium of claim 15, wherein:
   the distributed processing system comprises a plurality of data processors, each data processor being capable of performing each of the plurality of agent processes; and
   throttling performance of the first process comprises adjusting a number of data processors currently performing the first process.

19. The non-transitory computer readable medium of claim 18, wherein the operations further comprise:
   determining a processing speed of the second agent process, and wherein throttling performance of the first process comprises reducing a processing speed of the first agent process to a speed less than or equal to the processing speed of the second agent process by reducing the number of data processors currently performing the first agent process.

20. The non-transitory computer readable medium of claim 19, wherein the operations further comprise:
   increasing the processing speed of the second agent process by increasing the number of data processors currently performing the second agent process.

* * * * *